(12) United States Patent
Kushon et al.

(10) Patent No.: US 12,523,576 B2
(45) Date of Patent: Jan. 13, 2026

(54) SYSTEMS AND METHODS FOR COLLECTING AND ISOLATING SUBSTANCES FROM FLUID SAMPLES

(71) Applicant: Neoteryx, LLC, Torrance, CA (US)

(72) Inventors: Stuart A. Kushon, Lake Forest, CA (US); Yibo Guo, Torrance, CA (US); Boy Midas Hernandez Firme, Officer (AU)

(73) Assignee: NEOTERYX, LLC, Torrance, CA (US)

( * ) Notice: Subject to any disclaimer, the term of this patent is extended or adjusted under 35 U.S.C. 154(b) by 313 days.

(21) Appl. No.: 18/485,610

(22) Filed: Oct. 12, 2023

(65) Prior Publication Data

US 2025/0123187 A1 Apr. 17, 2025

(51) Int. Cl.
| | | |
|---|---|---|
| *G01N 33/49* | (2006.01) | |
| *G01N 1/18* | (2006.01) | |
| *G01N 1/40* | (2006.01) | |

(52) U.S. Cl.
CPC .............. *G01N 1/18* (2013.01); *G01N 1/405* (2013.01)

(58) Field of Classification Search
CPC ........ G01N 1/18; G01N 1/405; G01N 1/4077; G01N 33/491; G01N 1/22; G01N 1/2214; G01N 1/40
USPC ....... 73/19.12, 31.07, 863.21, 863.23; 95/45, 95/47–56; 96/4–14
See application file for complete search history.

(56) References Cited

U.S. PATENT DOCUMENTS

| | | | |
|---|---|---|---|
| 8,920,339 | B2 | 12/2014 | Mao |
| 10,071,381 | B2 | 9/2018 | Welch et al. |
| 10,531,821 | B2 | 1/2020 | Rudge et al. |
| 2003/0134100 | A1 | 7/2003 | Mao et al. |
| 2013/0116597 | A1 | 5/2013 | Rudge et al. |
| 2016/0349221 | A1 | 12/2016 | Goldman |
| 2017/0023446 | A1 | 1/2017 | Rietveld et al. |
| 2022/0071532 | A1 | 3/2022 | Kushon |

FOREIGN PATENT DOCUMENTS

| | | | | |
|---|---|---|---|---|
| CN | 106573201 A | * | 4/2017 | ............ B01D 61/20 |
| CN | 217138663 U | * | 8/2022 | |
| EP | 2375249 | | 12/2011 | |
| JP | 2006170726 A | * | 6/2006 | |

* cited by examiner

*Primary Examiner* — Robert R Raevis (74) *Attorney, Agent, or Firm* — STETINA GARRED BRUCKER & NEWBOLES (57) ABSTRACT

Methods and systems are contemplated in which a leading substance may be separated from a lagging substance. A fluid sample comprising the leading substance and the lagging substance can be applied to an absorption substrate through which the leading substance and the lagging substance may diffuse throughout. The absorption substrate may be in contact with a separation substrate to form a fluid pathway therebetween, allowing the leading substance and the lagging substance to then diffuse throughout the separation substrate. The separation substrate may be operative to permit the leading substance to diffuse throughout the separation substrate while impeding the diffusivity of the lagging substance, which may allow the leading substance to separate from the lagging substance. A collecting element may collect the leading substance from the separation substrate at a portion of the separation substrate where sufficient separation between the substances has occurred.

20 Claims, 6 Drawing Sheets

FIG. 10 ial state, whi# SYSTEMS AND METHODS FOR COLLECTING AND ISOLATING SUBSTANCES FROM FLUID SAMPLES

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present disclosure relates to the field of separating and isolating two or more substances of a fluid sample from each other via differences in their diffusivity through substrates. In particular, the present disclosure relates to the separation of a leading substance from a lagging substance via differences in their diffusivity through substrates that are constructed and set in a geometric configuration to purify precise amounts of the leading substance.

Human blood is composed of two main species: blood cells and blood plasma, with blood cells make up around 45% of the total blood by volume, while blood plasma makes up the leftover 55%. However, blood plasma itself is mostly made up of water (around 95% by volume), and the leftover portion is made up of a number of other substances which include hormones, clotting factors, and dissolved proteins like globulins and fibrinogen. Even though these substances make up such a small portion of the blood, they all play a vital role in blood clotting, carrying electrolytes to muscles, and maintaining the proper pH balance.

The separation and recovery of blood plasma from the cellular components of a blood sample can lend itself to a number of medical applications. Analyzing purified blood plasma from a patient can yield information about that patient's health, such as by measuring the protein content in the blood plasma. While numerous methods and techniques exist for separating blood plasma from blood cells, these methods have clearly fallen short of properly alleviating this blood plasma shortage. Additionally, many of these techniques require long time scales to achieve effectual separation and/or have inconveniences that leave a lot to be desired. It can be seen that new and improved methods and systems to separate blood plasma from a blood sample are needed and desired in the art.

BRIEF SUMMARY

To solve these and other problems, methods and systems are contemplated in which a leading substance may be separated from a lagging substance. A fluid sample comprising these substances may be applied to an absorption substrate which may absorb some of this fluid sample along with the leading substance and lagging substance it contains. These substances may then diffuse further throughout a separation substrate via the separation substrate being in contact with the absorption substrate to form a fluid pathway therebetween. In order to achieve separation between the two types of substances, the separation substrate may be constructed so as to permit the leading substance to diffuse throughout the separation substrate while also impeding the diffusivity of the lagging substance throughout the separation substrate. The differences between the diffusivities of these substances throughout the separation substrate may allow the leading substance to diffuse faster than the lagging substance. This can be taken advantage of by a collector comprising a collecting portion which can collect the substances which diffuse to a portion of the separation substrate the collecting portion is in contact with. Thus, the collecting portion may be positioned to collect the leading substance at a point of the separation substrate in which the leading substance has sufficiently separated from the lagging substance. In order to avoid collecting the lagging substance, the collecting portion's ability to collect substances from the separation substrate may be ceased soon before the lagging substance diffuses to the position the collecting portion was set to.

This subject matter may embody itself in the form of a separation device comprising the absorption substrate, the separation substrate, and the collector. One or more of these components may be at least partially enclosed in a housing. This housing may serve to shield the internal components of the separation device, induce a certain condition inside the separation device, and/or ensure a particular geometry between the components of the separation device. The housing may itself comprise multiple portions which can be removed from each other to allow one to remove, replace, and/or clean the internal components of the separation device.

The absorption substrate and the separation substrate can be of a porous medium through which the substances of the fluid may diffuse through via a capillary action mechanism. The materials in which these substrates can be made from include sponges, biological tissues, woods, rubbers, rocks, polymers, plastics, cellulosic materials (such a filter papers), zeolites, fibers, gels (including aerogels), foams, ceramics, porous carbon, and combinations thereof. The absorptive capacity of the absorption substrate may be operative to absorb a certain volume of the fluid sample, and this absorptive capacity can depend on the size and shape of the absorption substrate, the material of the substrate, and the porosity of the absorption substrate. As such, the absorption substrate may be carefully constructed so that it may absorb a precise amount of the fluid sample.

The absorption substrate and the separation substrate may both be comprised of one or more surfaces. Particular surfaces of the absorption substrate may be constructed to receive the fluid sample. One or more portions of the surface(s) of the absorption substrate and one or more portions of the surface(s) of the separation substrate may lay against each other to form the fluid pathway therebetween; this could define a layered structure between the two substrates. Depending on the orientation of the substrates, gravity may aid in the diffusivity of the substances from the absorption substrate to the separation substrate. Surfaces of the substrate may be spatially related to each other in that they are intersected by a vertical axis.

The collector may be operative to transition between at least a collecting state and a standby state, with the former being the state in which the collecting element may collect the substances from the separation substrate and the latter being the state in which the collecting element is ceased from collecting substances from the separation substrate. Some embodiments may have the collecting element placed out of contact with the separation substrate when the collector is in the standby state. The collector could be operative to transition between these states via rotating the collector about a rotation axis. Other embodiments need not have the collector be movable in order to achieve a transition between the collecting and standby states. A removal state, a third state the collector could be operative to transition between, may allow the collector to be removed from the separation device, which could allow the leading substance the collecting portion has collected to be more easily processed, analyzed, or otherwise use as desired. The body portion and the collecting portion of a collector may be operative to be coupled to each other and they may further be operative to be removed from each other as separate pieces.

The absorption substrate, the separation substrate, and/or the housing may have active species incorporated into them, such as within the porous matrix of one of the substrates or the walls of the housing. These active species may play a role in aiding the separation of the leading substance from the lagging substance and/or preventing a substance from being damaged. These active species include desiccants, humectants, antioxidants, ionic species, sequestrants, emulsifiers, polar substances, non-polar substances, resins, catalysts, magnetic substances, buffers, and combinations thereof.

The subject matter disclosed herein may also embody itself in the form of a method to separate leading substances from lagging substance. These methods may comprise the steps of applying a sample fluid to an absorption substrate, allowing the leading substance and lagging substance to diffuse throughout the absorption substrate and separation substrate, allowing a collecting portion of a collector to collect the leading substance from the separation substrate, and ceasing the collecting portion from collecting any substances in the separation substrate. A collection period may be the period of time between the step of allowing the collecting portion to collect the leading substance and the step of ceasing the collecting process of the collecting portion. The collection period may be based on the amount of time it would take for the collecting portion to collect the lagging substance, as ideally the collecting portion would be prevented from collecting the lagging substance. Therefore, the configurability of the separation substrate and how particular substances diffuse throughout it may influence the length of the collection period.

BRIEF DESCRIPTION OF THE DRAWINGS

These and other features and advantages of the various embodiments disclosed herein will be better understood with respect to the following description and drawings, in which like numbers refer to like parts throughout, and in which.

Common reference numerals are used throughout the drawings and the detailed description to indicate the same elements.

DETAILED DESCRIPTION

Disclosed herein are systems and methods in which a leading substance of a fluid sample may be separated from a lagging substance of that fluid sample. An absorption substrate may receive the fluid sample to then absorb some of the supplied fluid sample; the substances of the fluid sample may diffuse throughout the absorption substrate after the fluid sample is absorbed in this manner, which could include the leading substance and the lagging substance. A separation substrate may be in contact with the absorption substrate to form a fluid pathway therebetween, through which the substances that have diffused through the absorption substrate may travel through to then further diffuse throughout the separation substrate. Within the separation substrate, the leading substance may be separated from the lagging substance, with one mechanism in which such separation may occur could be via the separation substrate being constructed so as to permit the leading substance to diffuse throughout the separation substrate while impeding the diffusivity of the lagging substance through the separation substrate. A collecting portion of a collector may be operative to collect substances that have diffused to certain portions of the separation substrate. The difference in diffusivity throughout the separation substrate of the substances may thus allow the collecting portion to collect a leading substance that has diffused further through the separation substrate and not the lagging substance that would lag behind it. After a certain criterion has been met, such as time passed or an amount of leading substance collected, the process of the collecting of substances from the separation substrate can be ceased, such as via the collector being transitioned from a collecting state to a standby state.

The fluid samples can be any type of fluid that comprises two or more substances, including a leading substance and a lagging substance that can be separated from each other . . . . Ideally, the fluid comprises a liquid solvent in which the leading substance and the lagging substance are found within, as liquids may more easily and predictably diffuse throughout the porous medium of the substrates. The leading substance and the lagging substance can be dissolved in the solvent, and the substances could be miscible in the solvent, immiscible in the solvent, or any intermediate state of miscibility in the solvent. It is worth noting that the solvent itself could also be the leading substance or the lagging substance in some embodiments (i.e., separating a leading substance from the lagging substance of the solvent it is dissolved in). The fluid sample may also be comprised of additional substances including inert substances, spectator substances, stabilization substances operative to stabilize one or more of the other substances, and more. These additional substances may be collected alongside the leading substance, may remain in the absorption substrate and/or the separation substrate and thus not be collected by the collector, or both (some collected with the leading substance and some remaining in one or both of the substrates).

While preferably as much of the leading substance will be separated and collected in implementations of these systems and methods, only at least some of the leading substance from the original fluid sample may be separated and collected. The leading substance which is separated and collected may be a single type of molecule/species, or the leading substance could be a mixture of different species that at least partially make up the mixture collected by the collector (e.g., a mixture of different types of proteins). The lagging substance present in that fluid sample may similarly be a single type of molecule/species or a mixture of different species. If it is this latter case, those different species may differ in properties, and as such different degrees of separation may occur in the separation substrate from one species to the next.

Several types of fluid samples comprising varying types of leading substances and lagging substances can be used in the systems and methods disclosed herein, including naturally occurring fluid samples and synthetic fluid samples. In particular, a working embodiment has been effectively implemented in which a human blood sample comprising blood plasma and red blood cells was used as the fluid sample, with the blood plasma being the leading substance that was separated from the lagging substance of the red blood cells. However, the systems and methods disclosed herein need not be limited in this manner, as it is contemplated that these methods and systems could be implemented in numerous applications in which one may wish to isolate a leading substance and a lagging substance from each other due to one substance contaminating the other substance in one way or another (such as by making the other substance impure, preventing the other substance from being used effectively in a certain application, etc.). Examples of the isolation of substances from each other in which it is envisaged that this disclosure could be applied to include the separation/purification of antibodies, proteins, amino acids, nucleic acids, carbohydrates, lipids, metabolites, vitamins, hormones, polymers, neurotransmitters, steroids, cellular matter, isotopes, substance mixtures (e.g., oil fractions), inorganic substances, and more. Therefore, the present disclosure may find use in a variety of technical fields, such as medicine production, diagnostic methods, food/beverage production and processing, sterilization and disinfection methodologies (including separation of bacterial and virulent species), analytical techniques for identifying and experimenting with substances (including the studies of proteomics and lipidomics), providing therapeutic substances, productions of products including adhesives, reagents, surfactants, and oils, and more.

It may be desirable to separate the leading substance from the lagging substance and collect the leading substance so that the leading substance can be more easily analyzed, utilized in a particular application, etc. Alternatively, or additionally, it could be a goal to do the same for the lagging substance: separate it from the leading substance so that the lagging substance can be examined, used, etc. more easily compared to when the leading substance was present. If so, the lagging substance present in the absorption substrate following the separation process can be analyzed directly, as it could be more easily examined with the leading substance now less present, and/or additional steps can be taken such as further purification, extraction from the absorption substrate, and more before the lagging substance can be analyzed and/or utilized as desired. If a human blood sample is used, for instance, analytes of interest can be identified both in the collected plasma fraction as well as the blood fraction remaining in the absorption substrate.

The systems and methods disclosed herein will be best understood with respect to the drawings, wherein an exemplary embodiment of a separation device according to the present disclosure is shown. It is to be understood that the systems and methods disclosed herein need not be limited to this embodiment, as the elements and components of alternative embodiments may use different geometries, sizes, spatial relationships with one another, etc.

Figure 1:
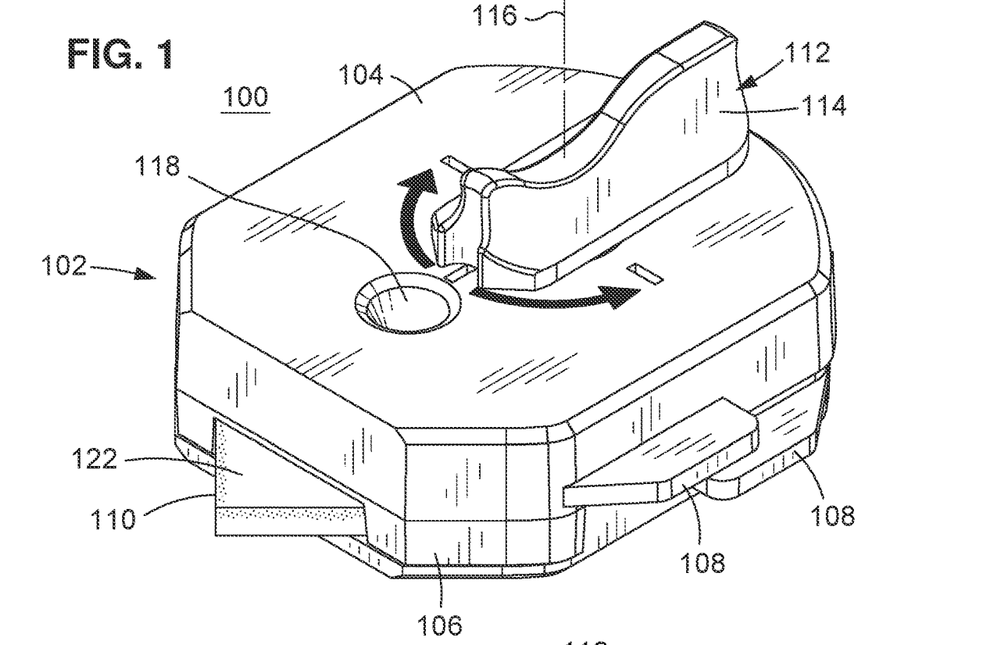
FIG. 1a shows perspective view of a separation device.

Looking first to FIG. 1, a perspective view of a separation device is shown. The separation device 100 may comprise a housing 102 which may at least partially enclose one or more components of the separation device 100. The housing 102 and the overall separation device 100 may be small and compact to comfortably fit in a user's hand, although alternative devices and housings may be bigger and smaller than the depiction of FIG. 1. The overall size of the separation device may depend on the type of application in which it is implemented into, with larger separation devices perhaps being more suitable for mass production of a market product while smaller separation devices may be more fit for microfluidics applications or precise purification methodologies. The housing 102 may serve to prevent external species from contaminating the substances and components enclosed by the housing 102, maintain a certain condition inside the housing (such as temperature, pressure, etc.), and/or ensure the proper spatial relationship between the various features of the separation device 100. Certain embodiments of the housing 102 may create a seal in which the elements and components enclosed by the housing 102 are isolated from the outside (such as a hermetic seal). While not shown, the housing 102 can incorporate additional components to aid in the processes that can occur inside the housing 102; these components may include a temperature adjusting element operative to raise and/or lower the temperature inside the housing 102, a gas release valve which may allow gasses to be released from the housing 102, and/or an inlet in which additives like inert species or stabilizers may be introduced to the inside of the housing 102. These types of additional components could be completely separate from and external to the separation device 100 and may act upon the separation device 100 to achieve similar results.

The housing 102 may be comprised of a top portion 104 and a bottom portion 106 which may be coupled to each other via an interlocking mechanism. The interlocking mechanism may allow the two portions 102, 104 to snap into a predetermined configuration which is held together by friction. Other coupling mechanisms in which portions of a separation device may be coupled to each other may include magnetic attraction, torsional coupling, tethering, and more. Combinations of these mechanisms may be utilized as well in a separation device. The top portion 104 and bottom portion 106 may be separated from each other and reattached as desired, and both can be replaced with another top portion 104 or another bottom portion 106 as needed. Features may be incorporated into the top portion 104 and bottom portion 106 that allow the two portions to be more easily separated from one another, such as protrusions 108. The protrusions 108 may allow a user to separate the top portion 104 from the bottom portion 106 via pulling the protrusions 108 away from each other in the proper direction with sufficient force. Separating the top portion 104 and bottom portion 106 may allow the internal features of the device to be cleaned, removed, and/or replaced as needed or desired. The housing of a different separation device may be comprised of more than two portions all of which may independently be separated from each other and employ similar features as that of the top portion 104 and the bottom portion 106.

The housing 102 may be constructed of one or more different types of materials, including metals, glasses, plastics, ceramics, woods, polymers, fibers, rubbers, minerals, stones, composite materials, and combinations thereof. The material may be chosen or limited depending on the type of fluid sample utilized and the substances found therein, as it may be desirous to prevent the materials of the housing 102 from reacting with those substances and/or interfering with the separation processes. On the other hand, a housing 102 may comprise an active species that is operative to aid in the separation processes and/or prevent certain substances in the fluid sample from degrading or decomposing. Examples of such active species may include, but are not limited to, desiccants, humectants, antioxidants (including oxygen scavengers), ionic species, sequestrants, emulsifiers, polar substances, non-polar substances, resins, catalysts, magnetic substances, buffers, and combinations thereof.

A different separation device need not have a housing 102 and could simply have one or more surfaces on which the components and elements of the separation device may be disposed upon and/or associated with. This embodiment may be better suited for applications involving fluid samples composed of less fragile substances or where potential contamination is not a major issue. These exposed surfaces may incorporate similar features as those which the housing 102 may incorporate.

From this perspective view of FIG. 1, an absorption substrate 110 can be seen. The absorption substrate 110 may be partially enclosed in the housing 102 of the separation device 100. Ideally, at least portion of the absorption substrate 110 would extend out from the housing 102 of the separation device 100 so that the absorption substrate 110 can more easily receive a fluid sample. Another feature of the separation device 100 may have, which can be seen in the perspective view of FIG. 1, is a collector 112 comprising a body portion 114. As will soon be shown and discussed, the collector 112 may be operative to transition between different states, which may include a collecting state, a standby state, and a removal state.

Figure 2:
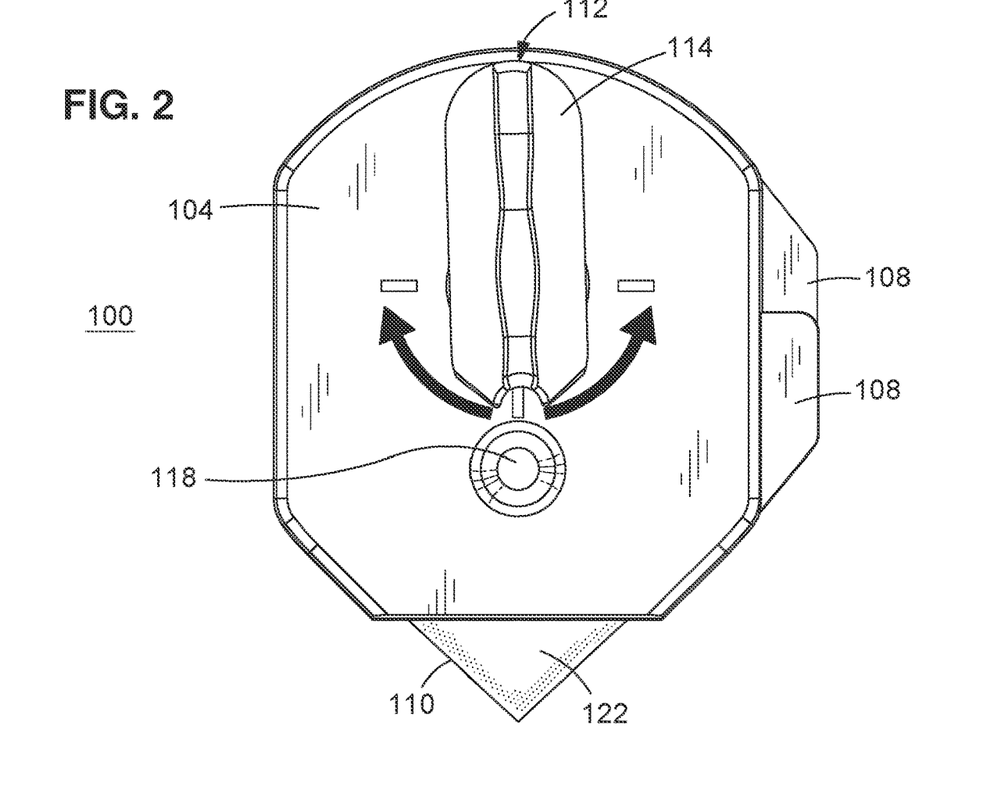
FIG. 2 depicts a top plan view of the same separation device of FIG. 1.

Turning now to FIG. 2, a top plan view of the same separation device of FIG. 1 is depicted. The housing 102 may define a window 118 which may grant a user a line of sight inside the housing 102 of the separation device 100. The window 118 may comprise a transparent, ideally inert material such as glass through which the line of sight may be provided. The window 118 may preferably not interfere with the processes that can occur in the separation device 100 or damage any of the substances in the cases where it is desirous prevent decomposition of those substances. If a substance in the fluid sample is prone to photodecomposition, for example, it may be preferable to omit windows 118 or to include a removable cover (not depicted) which can be placed over the window 118 to prevent light from entering through the line of sight provided by the window 118. A window 118 may allow one to monitor the processes inside the separation device 100, which could be advantageous as one or more of these processes could be capable of being monitored visually. In the embodiment of FIG. 2, some of the internal components of a separation device 100, like the absorption substrate 110, could be seen through the line of sight provided by the window 118, although windows in different parts of the separation device 100 may provide a line of sight to different internal components enclosed by the housing 102. More than one window may be on a separation device, and a window may come in a different size and shape than the window 118 of FIG. 2.

Figure 3:
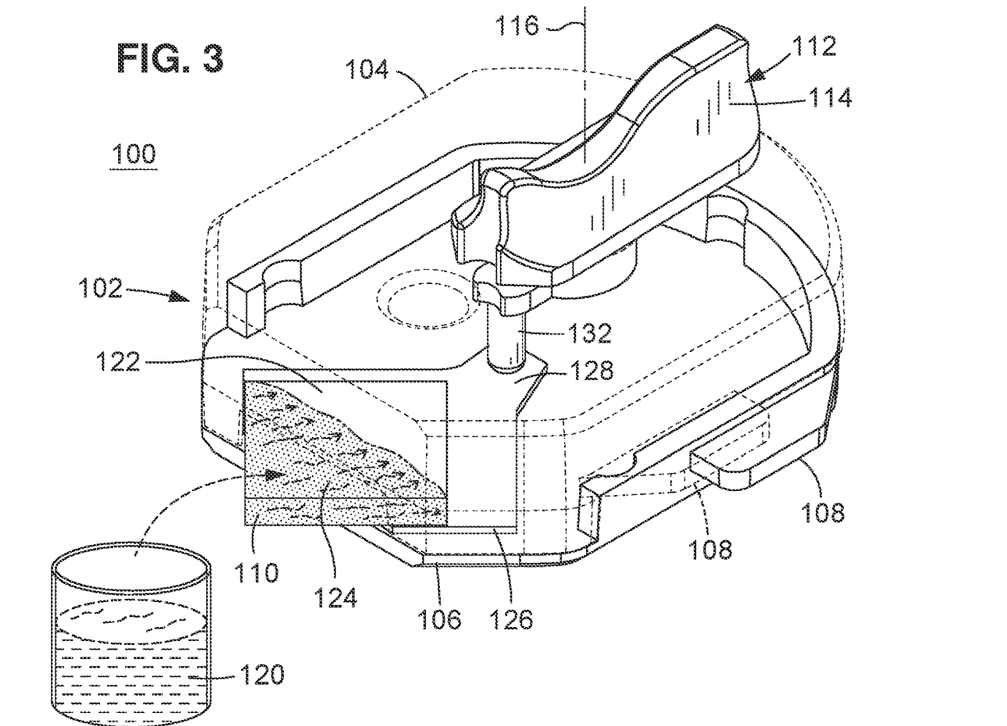
FIG. 3 illustrates a partially translucent perspective view of the separation device of FIG. 1 with the absorption substrate receiving a fluid sample.

Bringing our attention now to FIG. 3, a partially translucent perspective view of the separation device of FIG. 1 is shown illustrating the absorption substrate receiving a fluid sample. Here, it can be seen that a fluid sample 120 comprising a leading substance and a lagging substance can be received by the absorption substrate 110. An absorption substrate 110 may be comprised of one or more surfaces which can depend on the geometry and size of the absorption substrate 110. This separation device 100 has a square shaped absorption substrate 110 with six surfaces, a top surface 122, a bottom surface, and four side surfaces therebetween. As will be discussed, the absorption substrate 110 may be intended to be placed in a particular orientation (i.e., the top surface 122 of the absorption substrate 110 may be constructed differently than the bottom surface of the absorption substrate 110 even though they may have substantially the same geometry), although in other embodiments similar surfaces may be constructed similarly (so that in certain embodiments the absorption substrate 110 could be flipped upside down but still function substantially the same). The geometry of the absorption substrate 110 may differ from the one depicted, and as such it could be completely round with one continuous surface, disk-shaped, more triangular, or any other type of geometric shape with any number of surfaces.

An absorption substrate 110 may receive the fluid sample 120 via the fluid sample 120 being applied to the absorption substrate 110, such as via pouring, dripping, or otherwise emplacing the fluid sample 120 onto the absorption substrate 110. The absorption substrate 110 could also or alternatively be at least partially submerged in the fluid sample 120 to receive the fluid sample 120. Once receiving the fluid sample 120, the absorption substrate 110 may absorb the fluid sample 120. The absorption substrate 110 may be comprised of a porous material into which the fluid sample 120 may be absorbed into and diffuse throughout via capillary action. The material of the absorption substrate 110 may be comprised of includes, but is not limited to, sponges, biological tissues, woods, rubbers, rocks, polymers, plastics, cellulosic materials (such a filter papers), zeolites, fibers, gels (including aerogels), foams, ceramics, porous carbon, and combinations thereof. In this respect, materials implemented in structures like lateral flow strips can be used in the absorption substrate 110. The absorption substrate 110 may incorporate active species which may affect the absorption and diffusivity of a fluid sample 120 and its substances throughout the absorption substrate 110. The types of active species may be the same types as those that could be incorporated into the housing 102, although these active species may be incorporated into the porous medium of the absorption substrate 110. Absorbed fluid 124 in the absorption substrate 110 may be substantially the same as the original fluid sample 120, although there could be substances present in the original fluid sample 120 that do not as easily get absorbed into the absorption substrate 110 depending on the relationship between the absorption substrate 110, active species present, and an that substance (i.e., a polarity-based repulsion), which could cause the absorbed fluid 124 and the sample to fluid 120 to differ in composition. In most cases, the absorbed fluid 124 may include both the leading substance and the lagging substance. While the absorbed fluid 124 is colored darker in FIG. 3 to signify its presence in the absorption substrate 110, and while the presence of an absorbed fluid 124 could be recognized via a different coloration of the absorption substrate 110 (such as the case with a fluid sample 120 of a blood sample), in reality the absorbed fluid 124 need not noticeably change the coloration of the absorption substrate 110, as could be the case with clear fluid samples.

One benefit that the absorption substrate 110 may yield is its capacity to absorb a precise volume of a fluid sample 120. The material of the absorption substrate 110, the size of the absorption substrate 110, and the porosity of the absorption substrate 110 may be modified and carefully chosen to obtain a certain absorptive capacity corresponding to a volume of fluid sample 120 to be absorbed. This could aid in the process of separating the leading substance from the lagging substance, as certain and types of fluid samples 120 and the substances found therein may yield differing separation results when a different volume of absorbed fluid sample 124 is absorbed by the absorption substrate 110. For example, the absorption substrate 110 may absorb a precise volume of a fluid sample 120 between 60 and 300 microliters.

One or more of the surfaces of some embodiments of the absorption substrate 110 may be particularly constructed to receive the fluid sample 120 when compared to the rest of the surfaces of that absorption substrate 110. In the case of the absorption substrate 110 in this separation device 100, this surface intended to receive the fluid sample 120 may be the top surface 122. A surface of the absorption substrate 110 which is intended to receive the fluid sample 120 in this manner may have a higher absorptive capacity in that region of the absorption substrate 110 when compared to the other surfaces of the absorption suberate 110, may have a higher concentration of active species operative to attract one or more of the components of the fluid sample 120 into the absorbent substrate 110, and/or may have a feature to allow the fluid sample 120 to be more easily received (such as a divot or other type of indentation where the fluid sample 120 can be directed into, a protuberance to apply the fluid sample 120 onto, etc.). The entirety of this type of surface on the absorption substrate 110 can be specially constructed to receive the fluid sample 120, or alternatively only a portion of the absorption surface 122 may be constructed in this manner. This could be employed in this depicted separation device 100, in which the portion of the top surface 122 of the absorption substrate 110 which extends out from the separation device 100 may be constructed to receive the fluid sample 120 while the rest of the top surface 122 enclosed in the housing 102 may not be constructed as such, for instance.

Figure 4:
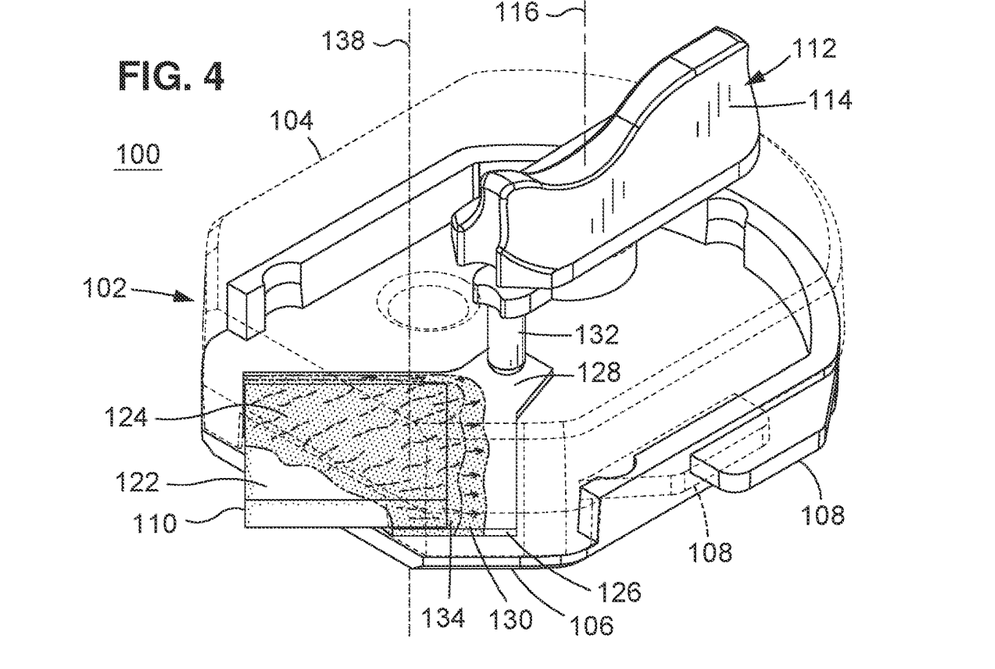
FIG. 4 portrays the same partially translucent perspective view of the separation device of FIG. 3 while illustrating how substances may be separated from each other within the separation substrate.

Looking to FIG. 4 now, the same partially translucent perspective view of the separation device of FIG. 3 is portrayed illustrating how substances may be separated from each other within the separation substrate. The separation process to be detailed herein may follow the aforesaid process above of the absorption substrate 110 receiving the fluid sample 120. The separating device 100 may further comprise a separation substrate 126, which may receive the absorbed fluid 124 from the absorption substrate 110. A separation substrate 126 may, like the absorption substrate 110, be comprised of one or more surfaces, which may depend on the geometry, size, and configuration of the separation substrate 126. The separation substrate 126 depicted in FIG. 4 has a top surface 128, a bottom separation surface, and multiple side separation surfaces therebetween. One mechanism in which the separation substrate 126 may receive the absorbed fluid 124 could be via the separation substrate 126 being in contact with the absorption substrate 110 so as to provide a fluid pathway for the substances of the absorbed fluid 124 to travel through so that they may diffuse into and throughout the separation substrate 126. The contact between the surfaces can be achieved via a portion of one or more of the surfaces of an absorption substrate 110 overlapping and laying against a portion of one or more of the surfaces of a separation substrate 126. A greater the overlap between the surfaces of the substrates 110, 126 (i.e., the larger the portions of the substrates which are in contact with one another) may cause the substances to flow into the separation substrate 126 faster, since the fluid pathway may be able to accommodate a higher substance transfer rate. The geometry of the separation device 100 and the housing 102 and how the two may cause the absorption substrate 110 and the separation substrate 126 to have a particular spatial relationship with one another may result in this contact between surfaces of the two substrates 110, 126. For example, the interlocking of the top portion 104, with which the absorption substrate 110 could be associated with, and the bottom portion 106, with which the separation substrate 126 could be associated with, may cause the absorption substrate 110 and the separation substrate 126 to form a geometric configuration in which a surface of both substrates 110, 126 lay against each other properly, such as the case shown in this FIG. 4.

The separation substrate 126 may absorb the substances of the absorbed fluid sample 124 through the fluid pathway formed by the contact between the substrates 110, 126. The separation substrate 126 may, like the absorption substrate 110, be made of a porous material, including but not limited to sponges, biological tissues, woods, rubbers, rocks, polymers, plastics, cellulosic materials (such a filter papers), zeolites, fibers, gels (including aerogels), foams, ceramics, porous carbon, and combinations thereof, that may absorb substances from the absorbed fluid 124 via a capillary action mechanism. The same types of active species may be utilized in the separation substrate 126 as those that could be used in the housing 102 and the absorption substrate 110. However, the separation substrate 126 may be made and constructed differently than the absorption substrate 110, via differing geometry, materials, and/or active species, to at least more effectually separate the leading substance from the lagging substance of the absorbed fluid 124.

One mechanism by which the separation substrate 126 may achieve this separation could be by allowing the leading substance to more easily be absorbed and diffuse throughout the separation substrate 126, while impeding the lagging substance from quickly or as easily doing the same. The lagging substance from the absorbed fluid 124 may still be capable of diffusing throughout the separation substrate 126, although ideally the hinderance caused by the separation substrate 126 would cause the lagging substance to diffuse slower than the leading substance and thus lag behind the leading substance. This phenomenon can be seen in FIG. 4, in which a leading mixture 130, which may comprise some of the leading substance, diffuses through the separation substrate 126 faster than a lagging mixture 134, which may comprise some of the lagging substance. The leading mixture 130 may still include additional species and substances like a solvent, inert substances, and/or spectator substances alongside the leading substance, but ideally this leading mixture 130 would be substantially free of the lagging substance of the original fluid sample 120. The leading mixture 130 and the lagging mixture 134 are shaded in FIG. 4 so as to highlight one example of their diffusivity throughout the separation substrate 126, and while the leading mixture 130, the lagging mixture 134, or both may be visually discernable (allowing one to track the rate of diffusivity, which could be monitored through a window 118), one or more of these mixtures may be more clear/not recognizable while in the separation substrate 126. Depending on the number and nature of substances in the original fluid sample 120, more than one discernable leading mixture 130 and/or more than one discernable lagging mixture 134 may develop and separate from each other as the substances of the absorbed fluid 124 diffuse throughout the separation substrate 126.

One or more types of separation methodologies may be employed by the separation substrate 126 to separate the leading substance from the lagging substance through a difference in diffusivity between the substances. These separation methodologies may take advantage of a difference in a property between the substances, including but not being limited to magnetic affinity, ionic affinity, polarity, size, and combinations thereof. The active species incorporated into the housing 102, the absorption substrate 110 and/or the separation substrate 126 may take advantage of these properties, such as a resin that is positively charged, allowing a negatively charged leading substance to diffuse through the separation substrate 126 faster than a more positively charged lagging substance.

Particular surfaces of the absorption substrate 110 and/or the separation substrate 126 may be intersected by a vertical axis 138, as is the case for the top surface 122 and bottom surface of the absorption substrate 110 as well as the top surface 128 of the separation substrate 126. When portions of these surfaces are placed in contact with each other, this configuration may cause those portions of the absorption substrate 110 and the separation substrate 126 to form a layered structure. Depending on how the surfaces are aligned and when a separation device is oriented properly, gravity may assist in the diffusion and separation processes. For example, the top surface 122 of the absorption substrate 110 in this separation device 100 may receive the fluid sample 120, after which gravity may help the absorbed fluid 124 diffuse down through the bottom surface of the absorption substrate 110 and into the separation substrate 126 via its top surface 128.

The leading substance, now being free of and isolated from the lagging substance, may be obtained and collected from the separation substrate 126. In order to do so, the collector 112 may comprise a collecting portion 132 operative to collect some of the leading mixture 130 comprising the leading substance. The collector 112 may be made of sponges, biological tissues, woods, rubbers, rocks, polymers, plastics, cellulosic materials (such a filter papers), zeolites, fibers, gels (including aerogels), foams, ceramics, porous carbon, and combinations thereof. Different regions of the collector 112, like the body portion 114 and the collecting portion 132, may have differ in material composition. The body portion 114 and the collecting portion 132 may be operative to be coupled to each other and they may further be operative to be removed from each other as separate pieces. The collecting portion 132 may collect the leading mixture 130 when the collector 112 is set to a collecting state (as depicted here in FIG. 4); the collecting portion 132 may be in contact with a portion of a surface of the separation substrate 126 when the collector 112 is set to this collecting state (e.g., the top surface 128 of the separation substrate 126 as shown in this separation device 100). The collecting portion 132 need not be limited to being in contact with just a region of one surface of the separation substrate 126, as different collectors and different collecting portions associated therewith may have the collecting portion in contact with more than one surface and/or in contact with multiple regions on one surface of the separation substrate 126. The portion of the separation substrate 126 that the collecting portion 132 is in contact with may take advantage of the geometry of the separation substrate 126 and the diffusivity differences of the substances to collect the leading mixture 130 at a point where the leading mixture 130 may diffuse to and where the leading mixture 130 has sufficiently separated from the lagging mixture 134. As such, this point may be spaced from the fluid pathway which the substances of the absorbed fluid 124 may enter the separation substrate 126.

Once the leading mixture 130 has diffused to the portion of the separation substrate 126 in which the collecting portion 132 is in contact with, the collecting portion 132 may collect the leading substance. The collecting portion 132 may collect other substances in the leading mixture 130 as well, and in some situations it may be desirous to do so in case one of those substances helps to stabilize the leading substance. Similar materials, active species, and absorption mechanisms as those which can be incorporated in the absorbent substrate 110 and the separation substrate 126 may be employed in the collecting portion 132 to aid in absorbing the substances, including a porous medium for the substances to diffuse further through. In particular, the porosity and hydrophilicity of the collecting portion 132 may be fine-tuned by selecting a material composition and optionally including active species so as to facilitate capillary action of the mixtures 130, 134 through the separation substrate 120 and the leading mixture 130 through the collecting portion 132. Working embodiments of the collecting portion 132 have effectively incorporated the features disclosed in Applicant's previously filed patent application Ser. No. 17/017,554 entitled "BIOLOGICAL FLUID SAMPLING DEVICE", the disclosure of which is incorporated herein by reference in its entirety.

Figure 5:
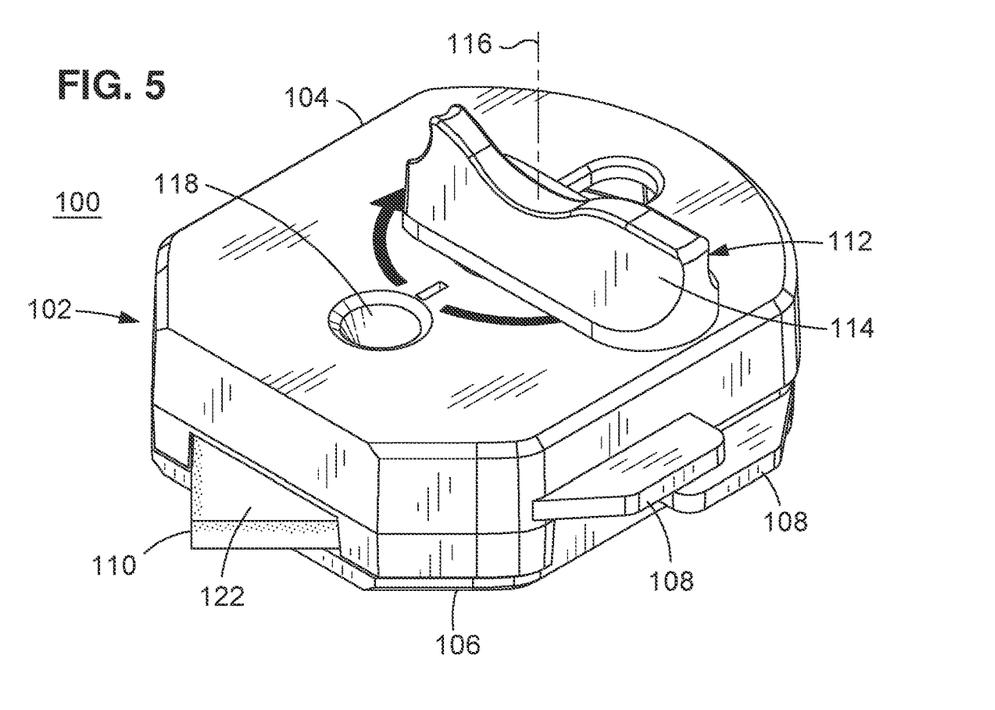
FIG. 5 shows the same perspective view of the separation device of FIG. 1 with the collector set to one configuration of the standby state.
Figure 6:
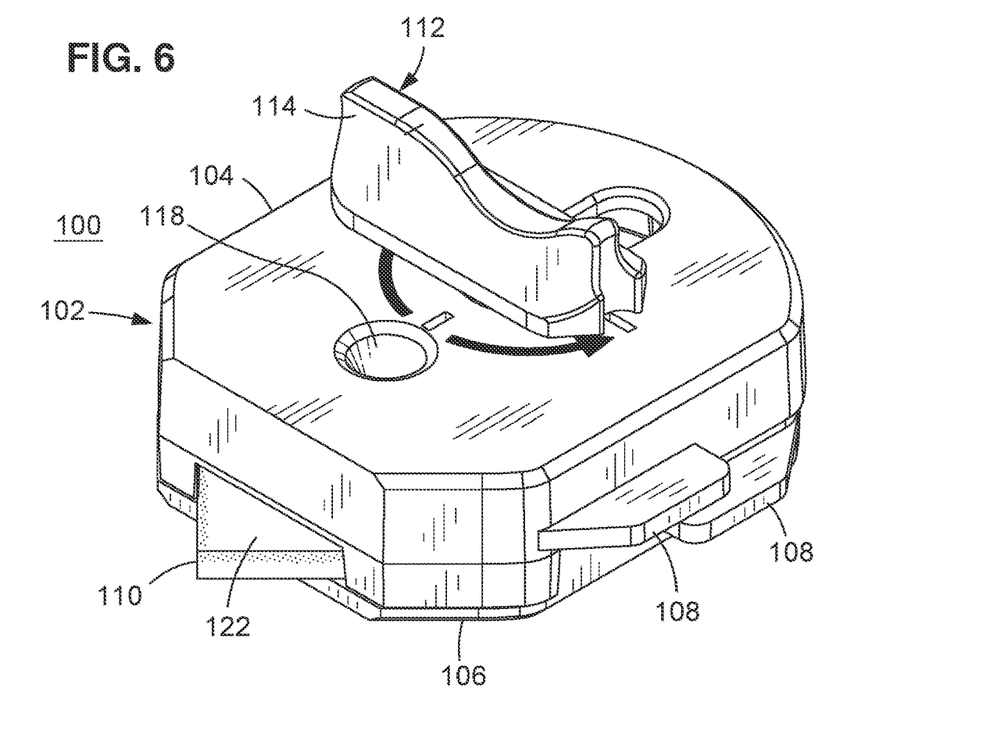
FIG. 6 shows the same perspective view of the separation device of FIG. 1 with the collector set to another configuration of the standby state.

Brining our attention now to FIG. 5 and FIG. 6, the same perspective view of the separation device of FIG. 1 with the collector set to the standby state is shown. As will be elaborated upon in the following figure, the collecting portion 132 may be prevented from collecting substances from the separation substrate 126 when the collector 112 is transitioned to the standby state. The collector 112 shown in this collecting device 100 utilizes a mechanical mechanism to transition in between the collecting state and the standby state via rotating the collector 112 about a rotation axis 116. The body portion 114 of the collector 112 may be shaped and configured to allow a user to comfortably and easily rotate the body portion 114 when that user applies a sufficient level of force in a proper direction. The collector 112 has been rotated in a particular direction in this FIG. 5, and the collector 112 can be configured to also or alternatively rotate in the opposite direction, as is the case in FIG. 6, to be transitioned to the standby state. Other mechanisms are contemplated which may be used to change the collector between the collecting state and the standby state, such as translational movement of the collector, a switch (which could be electronic) operative to turn off or otherwise cease the collecting portion's ability to collect substances from the separation substrate, deformation of the collector, and combinations thereof. Certain mechanisms of transitioning the collector from the collecting state to the standby state may thus not require movement of the collector relative to the separation device. The housing 102 may have indentations that allow the collector 112 to settle into certain locations when rotated/moved to a particular position.

Figure 7:
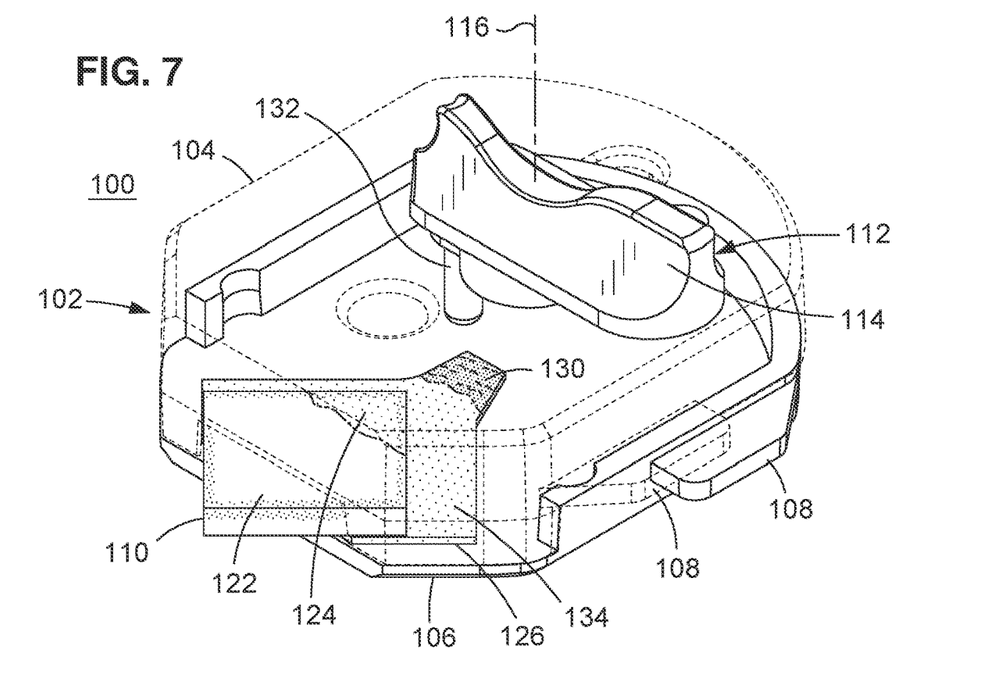
FIG. 7 depicts the same partially translucent perspective view of the separation device of FIG. 4 with the collector set to the standby state.

Looking now to FIG. 7, the same partially translucent perspective view of the separation device of FIG. 4 is shown with the collector set to the standby state. While in this state, the collecting portion 132 may no longer be collecting substances from the separation substrate 126, including the leading mixture 130 and any leading substance found therein as well as the lagging mixture 134 and any lagging substance found therein. Here, this is achieved by the collecting portion 132 being placed out of contact with the separation substrate 126. Transitioning the collector 112 to the standby state may allow the collected substances to dry, settle, equilibrate, etc., which may be desirous depending on the type of leading substance collected by the collecting portion 132. The collector 112 could also incorporate features to put the leading substance in a particular condition, such as a temperature adjusting element, a stabilization solution which the leading substance can be mixed in to expose the leading substance to a particular environment (such as a certain pH environment), and more. The collector 112 could also remain in the standby state until it is ready to be removed from the separation device 100, since it may be convenient for the collector 112 to remain in the separation device 100 until a user is ready to remove the collector 112. As discussed earlier, the collector 112 can be operative to be transition to the standby state without having to place the collecting portion 132 out of contact with the separation substrate 126, and in these cases the collecting portion 132 may be ceased from collecting substances from the separation substrate (such as by closing a fluid pathway therebetween).

The collector 112 can remain in the collecting state for a collection period before being transitioned to the standby state. The length of time for the collection period may be based on the diffusivity of one of the lagging mixtures 134. As can be more clearly seen in this view of FIG. 7, a lagging mixture 134, while being impeded from diffusing relative to the leading mixture 130, may still diffuse throughout the separation substrate 126 after enough time has passed. If the lagging mixture 134 were to reach the collecting portion 132 while the collector 112 is in the collecting state, the collecting portion 132 may collect substances from the lagging mixture 134, including the lagging substance found therein. To avoid this, the collection period may be predetermined and based on the time it would take for a lagging mixture 134 to start being collected by the collecting portion 132. It can be seen that the collection period could vary depending on numerous factors, including the size, shape, and geometry of the absorption substrate 110, the separation substrate 126, and the collecting portion 132, the absorptive capacity of each of those components, and the speed of diffusivity of the various substances of the fluid sample 120 throughout those components. Therefore, the two substances can be ideally separated from each other by allowing the substances to diffuse throughout the separation substrate 126, setting the collector 112 to the collecting state so that the collecting portion 132 may collect the leading substance, and setting the collector 112 to the standby state before the lagging substance may be collected by the collecting portion 132, which could be at the end of the collection period. A working embodiment has been successfully used to separate blood plasma from blood cells of a human blood sample with a collection period of 15 minutes, in which the start of that collection period was measured from when the portion of the absorption substrate 110 viewable through the window 118 turned red.

Figure 8:
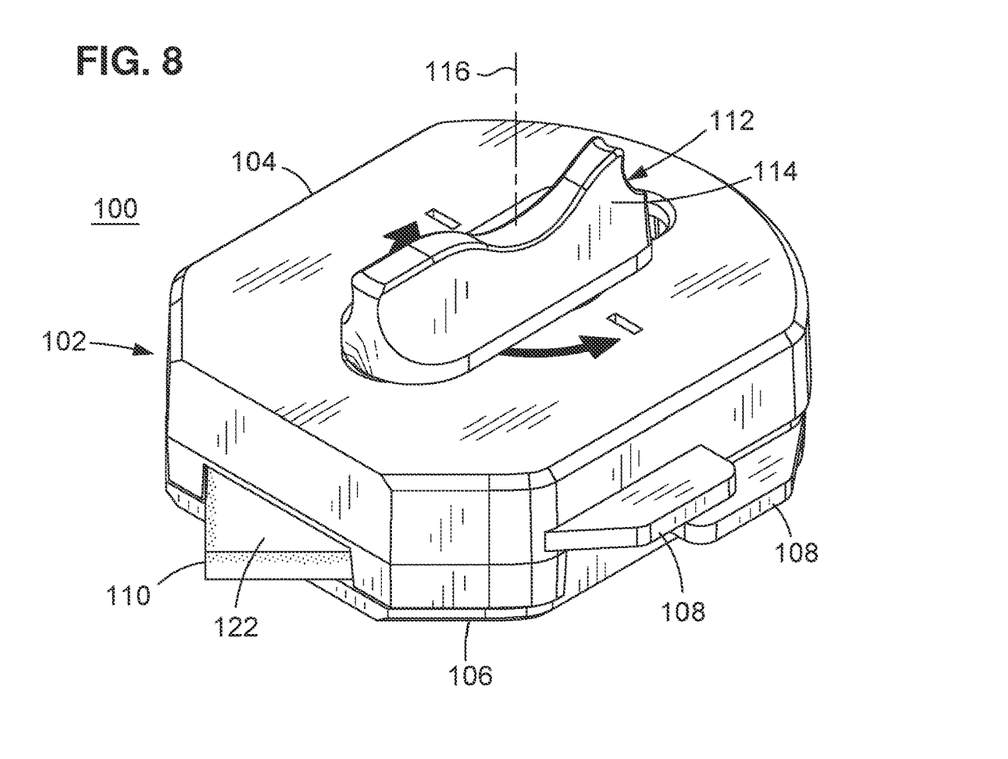
FIG. 8 illustrates the same perspective view of the separation device of FIG. 1 with the collector set to the removal state.

Turning to FIG. 8, the same perspective view of the separation device of FIG. 1 is illustrated with the collector set to the removal state. The collector 112 may first be transitioned to the removal state which may allow the collector 112 to become capable of being removed from the separation device 100. The collector 112, now carrying the collected leading substance, may then be moved to a location, laboratory, processing facility, etc. in which the leading substance collected by the collecting portion 132 may be utilized, analyzed, repurposed, packaged into a product, and/or used however one may wish to do so. Separating the collecting portion 132 from the body portion 114 could advantageously allow the collected substances to be transported and processed even easier if the collecting portion 132 contains the collected leading substance. The collector 112 and/or the separation device 100 may have an identifier put on it which may indicate to someone or be used to indicate to someone the substance(s) collected by the collector 112 and/or the substance(s) contained in the separation device 100 and the nature of these substances (concentration, reactivity, etc.). An example of such an identifier may be a barcode.

Figure 9:
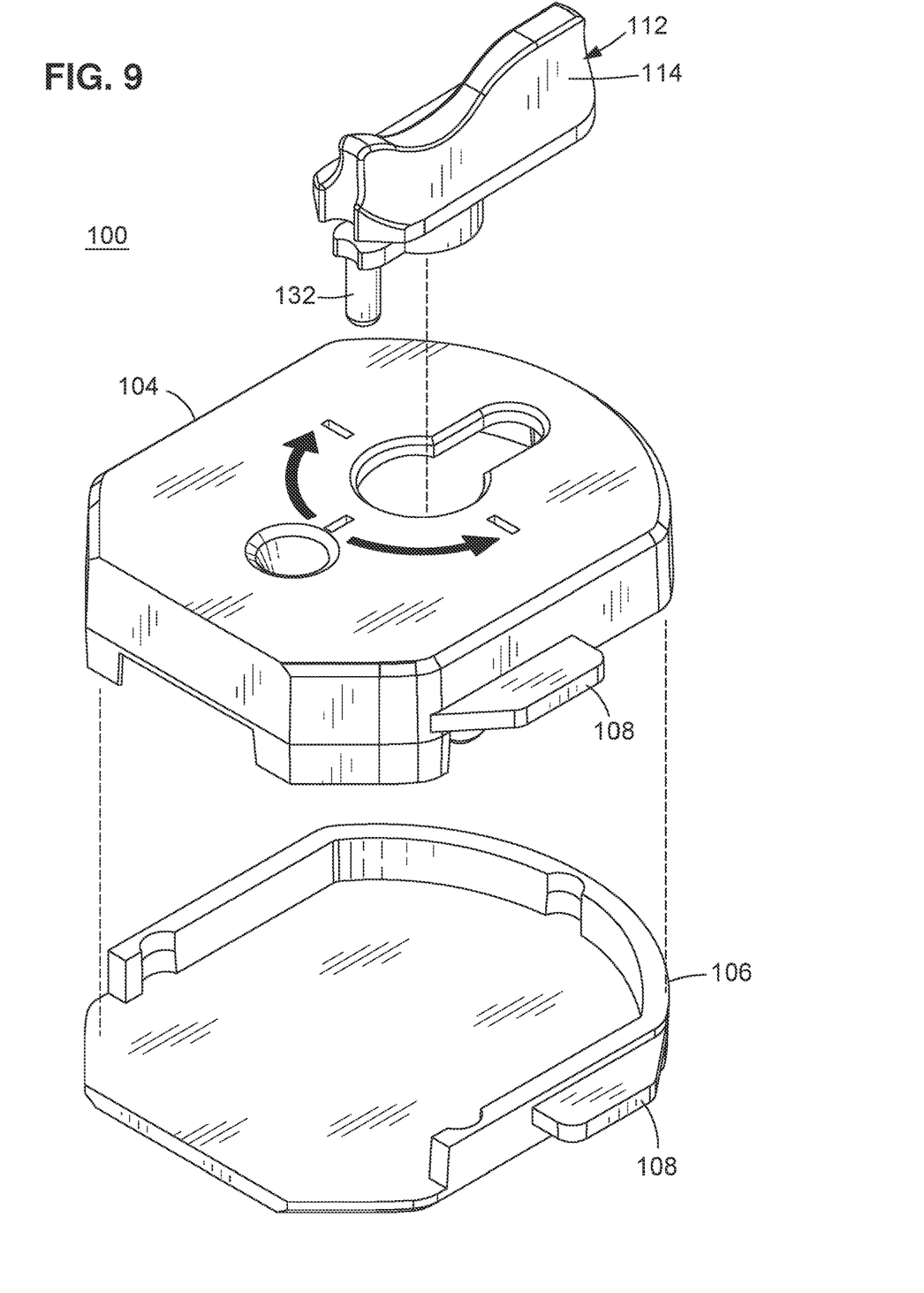
FIG. 9 portrays how the collector, the top portion of the housing, and the bottom portion of the housing of the separation device of FIG. 1 may be separated from each other.

Looking now to FIG. 9, the collector, the top portion of the housing, and the bottom portion of the housing of the separation device of FIG. 1 being separated from each other is portrayed. The collector 112 may be set to the removal state before being capable of being removed from the top portion 104. After the absorption, separation, and collecting processes have occurred, the absorption substrate 110 and the separation substrate 126 may be analyzed and/or processed further in order to examine any lagging substance therein, after which the substrates 110, 126 can be replaced or cleaned and reused before another fluid sample 120 can be received by the absorption substrate 110, allowing this whole process may be repeated. In this separation device 100, the top portion 102 and the bottom portion 104 may be separated from each other, possibly via a user taking advantage of the protrusions 108, so that the absorption substrate 110 and the separation substrate 126 may be exposed and removed from the separation device 100.

Figure 10:
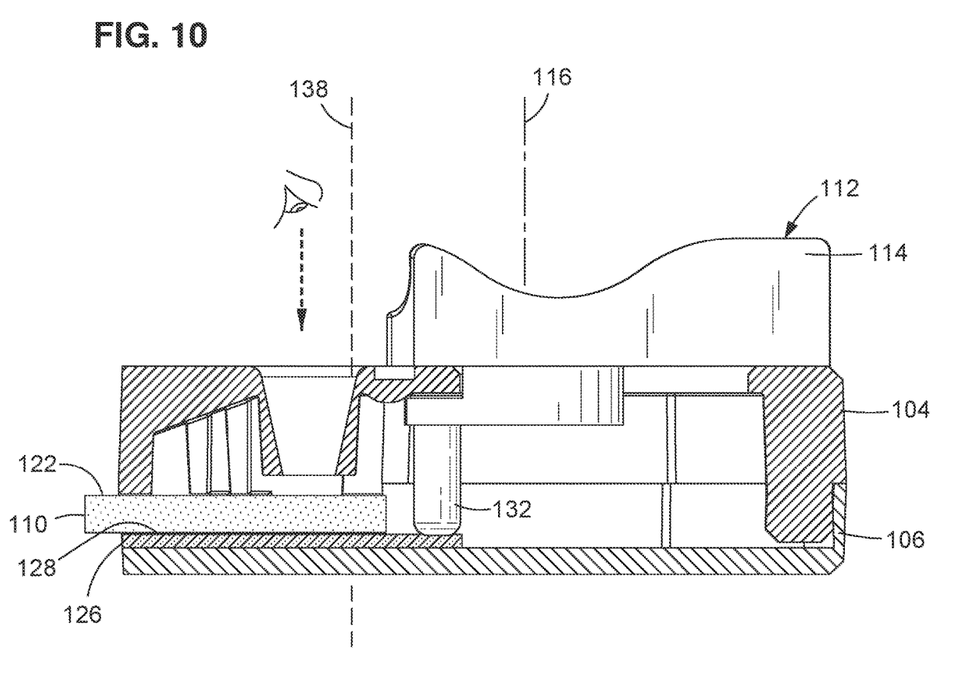
FIG. 10 shows a side cross sectional view of the separation device of FIG. 1.

Turning to FIG. 10, a side cross sectional view of the separation device of FIG. 1 is shown. Here, the spatial relationship between the components of the separation device 100 may be recognized. The layered structure resulting from the bottom surface of the absorption substrate 110 and the top surface 128 of the separation substrate 126 can be seen as well as how those surfaces, along with the top surface 122 of the absorption substrate 110, can be intersected by a vertical axis 138. The contact between the collecting portion 132 and the separation substrate 126 when the collector 112 is set to the collecting state may also be seen.

The above description is given by way of example, and not limitation. Given the above disclosure, one skilled in the art could devise variations that are within the scope and spirit of the systems and methods disclosed herein, including various ways of separating substances from one another and modifying a separation device operative to carry out such separation processes. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A separation device for receiving a fluid sample comprising a leading substance and a lagging substance and isolating the leading substance from the lagging substance, the system comprising:

an absorption substrate comprising one or more surfaces, the absorption substrate being operative to absorb at least some of the fluid sample when at least one of the one or more surfaces of the absorption substrate receives the fluid sample, the leading substance and the lagging substance at least partially diffusing throughout the absorption substrate;
a separation substrate comprising one or more surfaces, at least one of the one or more surfaces of the separation substrate being in contact with a surface among the one or more surfaces of the absorption substrate to form a fluid pathway therebetween, the separation substrate being operative to permit the leading substance to at least partially diffuse throughout the separation substrate while impeding the diffusivity of the lagging substance throughout the separation substrate; and
a collector, the collector being operative to transition between at least a collecting state and a standby state, the collector comprising a collecting portion, the collecting portion being placed in contact with a surface among the one or more surfaces of the separation substrate when the collector is in the collecting state, the collecting portion being operative to collect at least some of the leading substance that has at least partially diffused throughout the separation substrate when the collector is in the collecting state.

2. The separation device of claim 1, wherein the collecting portion is placed out of contact with the surface among the one or more surfaces of the separation substrate when the collector is in the standby state.

3. The separation device of claim 1, wherein the surface among the one or more surfaces of the separation substrate is the at least one of the one or more surfaces of the separation substrate.

4. The separation device of claim 1, wherein the collector is operative to transition between at least the collecting state, the standby state, and a removal state, the collector being removable from the separation device when the collector is in the removal state.

5. The separation device of claim 1, wherein the device further comprises a housing, the housing at least partially enclosing the absorption substrate, the separation substrate, and the collector.

6. The separation device of claim 1, wherein the absorption substrate and the separation substrate are emplaced in a geometric configuration, the geometric configuration emplacing at least a portion of the at least one of the one or more surfaces of the separation substrate surface in contact with at least a portion of the surface among the one or more surfaces of the absorption substrate.

7. The separation device of claim 6, wherein the emplacing of the at least a portion of the at least one of the one or more surfaces of the separation substrate surface in contact with the at least a portion of the surface among the one or more surfaces of the absorption substrate forms a layered structure.

8. The separation device of claim 1, wherein the at least one of the one or more surfaces of the absorption substrate, the at least one of the one or more surfaces of the separation substrate, and the surface among the one or more surfaces of the absorption substrate are intersected by a vertical axis.

9. The separation device of claim 1, wherein the absorption substrate is further operative to absorb a predetermined volume of the fluid sample.

10. The separation device of claim 1, wherein the separation substrate further comprises an active species, the active species being selected from a desiccant, a humectant, an antioxidant, an ionic species, a sequestrant, an emulsifier, a polar substance, a non-polar substance, a resin, a catalyst, a magnetic substance, a buffer, or combinations thereof.

11. The separation device of claim 1, wherein the collecting portion is removable from the collector.

12. A method of isolating a leading substance from a lagging substance, the method comprising the steps of:
(a) applying a fluid sample to an absorption substrate, the fluid sample comprising a plurality of substances including the leading substance and the lagging substance, the absorption substrate being operative to absorb at least some of the fluid sample when the fluid sample is applied to the absorption substrate;
(b) allowing the leading substance and the lagging substance to at least partially diffuse throughout the absorption substrate;
(c) allowing at least some of the leading substance and at least some of the lagging substance to diffuse throughout a separation substrate, the separation substrate being in contact with the absorption substrate to define a fluid pathway therebetween, the separation substrate being operative to permit the leading substance to at least partially diffuse throughout the separation substrate and impede the diffusivity of the lagging substance throughout the separation substrate;
(d) allowing a collecting portion of a collector to collect the at least some of the leading substance; and
(e) ceasing the collecting portion of the collector from collecting any of the plurality of substances.

13. The method of claim 12, wherein the step of ceasing the collecting portion of the collector from collecting any of the plurality of substances occurs after a collection period, the collection period being measured starting from the step of allowing the at least some of the leading substance and the at least some of the lagging substance to diffuse throughout the separation substrate.

14. The method of claim 13, wherein the collection period is at most the time for the collecting portion to start to collect the at least some of the lagging substance.

15. The method of claim 12, wherein during the step of allowing the collecting element of the collector to collect the at least some of the leading substance, the collecting element is placed in contact with the separation substrate, and wherein during the step of ceasing the collecting element of the collector from collecting any of the plurality of substances, the collecting element is placed out of contact with the separation substrate.

16. The method of claim 12, wherein the absorption substrate comprises one or more surfaces, and wherein a surface among the one or more surfaces of the absorption substrate receives the fluid sample during the step of applying the fluid sample to the absorption substrate.

17. The method of claim 12, wherein the absorption substrate comprises one or more surfaces and the separation substrate comprises one or more surfaces, and wherein during the step of allowing the at least some of the leading substance and the at least some of the lagging substance to diffuse throughout the separation substrate, the absorption substrate and the separation substrate are emplaced in a geometric configuration, the geometric configuration emplacing at least a portion of at least one of the one or more surfaces of the separation substrate in contact with at least a portion of at least one of the one or more surfaces of the absorption substrate.

18. The method of claim 17, wherein the emplacing of the at least a portion of the at least one of the one or more surfaces of the separation substrate surface in contact with the at least a portion of at least one of the one or more surfaces of the absorption substrate forms a layered structure.

19. The method of claim 12, wherein during the step of applying the fluid sample to the absorption substrate, the absorption substrate is further operative to absorb a predetermined volume of the fluid sample.

20. The method of claim 12, wherein the separation substrate further comprises an active species, the active species being selected from a desiccant, a humectant, an antioxidant, an ionic species, a sequestrant, an emulsifier, a polar substance, a non-polar substance, a resin, a catalyst, a magnetic substance, a buffer, or combinations thereof.

* * * * *